(12) United States Patent
Rhodes

(10) Patent No.: US 7,526,420 B2
(45) Date of Patent: Apr. 28, 2009

(54) METHOD AND SYSTEM FOR VIRTUAL INJECTION OF NETWORK APPLICATION CODES INTO NETWORK SIMULATION

(75) Inventor: David L. Rhodes, Brick, NJ (US)

(73) Assignee: OpCoast LLC, Brick, NJ (US)

( * ) Notice: Subject to any disclaimer, the term of this patent is extended or adjusted under 35 U.S.C. 154(b) by 577 days.

(21) Appl. No.: 10/700,976

(22) Filed: Nov. 4, 2003

(65) Prior Publication Data
US 2004/0102942 A1 May 27, 2004

Related U.S. Application Data

(60) Provisional application No. 60/429,215, filed on Nov. 27, 2002.

(51) Int. Cl.
G06F 13/10 (2006.01)
G06F 13/12 (2006.01)

(52) U.S. Cl. .................................................. 703/21

(58) Field of Classification Search .................... 703/21
See application file for complete search history.

(56) References Cited

U.S. PATENT DOCUMENTS

| | | | |
|---|---|---|---|
| 5,794,128 A | 8/1998 | Brockel et al. ............ 455/67.1 |
| 5,809,282 A | 9/1998 | Cooper et al. .............. 709/226 |
| 5,828,855 A | 10/1998 | Walker ....................... 710/305 |
| 5,862,362 A * | 1/1999 | Somasegar et al. ............ 703/21 |
| 5,881,269 A | 3/1999 | Dobbelstein ................. 703/21 |
| 6,028,846 A | 2/2000 | Cain ........................... 370/250 |
| 6,134,514 A * | 10/2000 | Liu et al. ....................... 703/17 |
| 6,314,531 B1 | 11/2001 | Kram ........................... 714/38 |
| 6,427,132 B1 | 7/2002 | Bowman-Amuah .......... 703/22 |
| 6,832,184 B1 * | 12/2004 | Bleier et al. .................. 703/23 |
| 6,845,352 B1 * | 1/2005 | Wang ........................... 703/24 |

(Continued)

OTHER PUBLICATIONS

Rohit Goyal, Raj Jain, Sonia Fahmy, Shobana Narayanaswamy; Modeling Traffic Management In Atm Networks With OPNET; May 1998; Proc. of OPNETWORK, Washington DC; pp. 1-6.*

NIIST Net—A Linux Based Network Emulation Tool; Computer Communications Review (Jun. 2003).

*Primary Examiner*—Paul L Rodriguez
*Assistant Examiner*—Juan C Ochoa
(74) *Attorney, Agent, or Firm*—Davidson, Davidson & Kappel, LLC

(57) ABSTRACT

A technique is provided for translating one or more networked applications to act virtually as if operating at a node or communication point within a network simulation. The invention disclosed herein has aspects of both emulation and simulation, allowing an actual networked application code (herein called simply 'application code') and simulated models to interact with each other in any combination. However, one or more application codes are virtually translated such that they appear to the rest of the simulated model(s) or applications code(s) to be resident at a simulated node. This simulated node may be any node (fixed or mobile) of the simulation, and one or more application codes can be mapped to a single node. Although the preferred embodiment would be the case where simulated time is synchronized to real-time, accelerated or slower than real-time simulation can also be used with the invention.

28 Claims, 5 Drawing Sheets

U.S. PATENT DOCUMENTS

| | | | |
|---|---|---|---|
| 6,922,663 B1 * | 7/2005 | Maurer ........................ | 703/13 |
| 7,006,963 B1 * | 2/2006 | Maurer ........................ | 703/21 |
| 7,099,947 B1 * | 8/2006 | Nadeau et al. .............. | 709/229 |
| 7,231,644 B2 * | 6/2007 | Kieffer ....................... | 719/331 |
| 7,457,737 B2 * | 11/2008 | Patiejunas ................... | 703/14 |
| 2001/0051862 A1 | 12/2001 | Ishibashi et al. .............. | 703/14 |

* cited by examiner

METHOD AND SYSTEM FOR VIRTUAL INJECTION OF NETWORK APPLICATION CODES INTO NETWORK SIMULATION

This application claims priority to U.S.Ser. No. 60/429,215, filed Nov. 27, 2002, the entire disclosure of which is hereby incorporated by reference.

BACKGROUND

Network simulation provides a means for evaluating and assessing communication performance based on modeling of various elements. In the current state of the art, a network simulator may include models for propagation loss, antennas, transmitter and receiver models, queuing, and protocol stacks. They usually include a means for specifying a communication load; this may be in the form of constant, variable or function-based bit rate generators, based on parametric models of application level codes (such as FTP or TELNET), etc. Most general-purpose network simulators are discrete-event based, meaning that models and load generators insert and extract 'time-stamped events' to/from a queue which are processed in-temporal order to maintain causality. Some of these events may represent packet queue insertion, removal or transference in a packet-based network, similar operations for messages in a message-based system as well as other abstract, non-physical elements that are artifacts of the modeling.

Many advancements have taken place in network simulation. For example, U.S. Pat. No. 6,427,132, "System, method and article of manufacture for demonstrating E-commerce capabilities via a simulation on a network" purports to disclose simulation of a more specific network simulation application in terms of an e-commerce user. Likewise, U.S. Pat. No. 6,134,514, "Large-scale network simulation method and apparatus", purports to disclose performing the simulation more efficiently by using distributed/parallel-programming techniques. U.S. Pat. No. 5,881,269, "Simulation of multiple local area network clients on a single workstation" purports to disclose efficient simulation of multiple clients using a single workstation. U.S. Pat. No. 6,134,514, "Large-scale network simulation method and apparatus" purports to disclose execution of the simulation using parallel computational techniques. U.S. Pat. No. 5,809,282, "Automated network simulation and optimization system" purports to disclose the use of network simulation to aid in network deployment, design and optimization. U.S. Pat. No. 5,794,128, "Apparatus and processes for realistic simulation of wireless information transport systems" purports to disclose the use of specific propagation loss models in simulation. US Patent Application No. 20010051862, "Simulator, simulation method, and a computer product" purports to disclose the use of measurements and prediction to aid in the creation of network simulation and modeling.

Similar to network simulation, network emulation uses hardware or software techniques to present varied network conditions to network application codes. In a typical setup, one or more network application codes (i.e., those that communicate over a network) are connected to a network emulation facility. Such a facility, for example, allows the application code(s) to be tested in a local network environment (e.g. on a LAN) while experiencing various network conditions that occur in wide area networks. These conditions can include packet losses, duplicate packets and out of order packet arrivals as well as other conditions. An example of a tool that provides network emulation is NIST Net. It allows statistical settings for determining packet losses, can reorder packets and provides other features based on rules defined in user settings. Some existing emulation techniques use address translations as a means for including application code(s) in the emulation. For such an emulation facility, inclusion of addresses in the data portion of a message(s) becomes problematic as the application code embedded address and that used during the emulation may be different (see Simmonds, Bradford, & Unger, "Applying parallel discrete event simulation to network emulation", Workshop on Parallel and Distributed Simulation (PADS), Bologna, Italy, pp. 15-22, 2000 heretofore called the "Simmonds reference"). While providing no solution, the Simmonds reference properly identifies the problem that most packet rewrite methods bear when the carrying network addresses in the data payload. They correctly state that this is "a difficult, computationally expensive or impossible problem even if a great deal is known about message formats."

Some extensions to basic emulation have been previously proposed. For example, U.S. Pat. No. 6,314,531, "Method and system for testing and debugging distributed software systems by using network emulation" purports to disclose the ability to avoid having to make any changes to the application code while maintaining the ability to emulate. U.S. Pat. No. 6,028,846, "Method and system for testing real-time delivery of packets of data" purports to disclose the use of a simulator, rather than a user-defined rule-set as in NIST Net, to act as an emulator between just a pair of network nodes. U.S. Pat. No. 5,862,362, "Network failure simulator" purports to disclose using user-defined settings to control and direct packet handlers that may emulate network disconnect on a workstation. U.S. Pat. No. 5,828,855, "Socket simulation protocol for network printing systems" purports to disclose emulating a network socket interface for a printer. Recent open publications have also expanded the forefront of emulation technology, for example, by using parallel simulation as the emulator and using packet-level rewriting/translation or insertion of routers between clients and servers to act in the emulation of the simulated network conditions (see Simmonds reference; and NIST Net, Computer Communications Review (June 2003).

SUMMARY OF THE INVENTION

The present invention provides a technique for translating one or more networked applications to act virtually as if operating at a node or communication point within a network simulation. In an embodiment according to the present invention disclosed herein, the disclosed invention has aspects of both emulation and simulation, allowing an actual networked application code (herein called simply 'application code') and simulated models to interact with each other in any combination. However, one or more application codes are virtually translated such that they appear to the rest of the simulated model(s) or applications code(s) to be resident at a simulated node. This simulated node may be any node (fixed or mobile) of the simulation, and one or more application codes can be mapped to a single node. Although the preferred embodiment would be the case where simulated time is synchronized to real-time, accelerated and decelerated simulation time can also be used with the present invention.

In an embodiment according to the present invention, a method for virtually simulating actual networked applications within a network simulation is provided. A server is initiated that interfaces to a network simulator, the server comprising functionality for establishment of a bidirectional mapping of each of one or more application codes to a simulated node or a communication port based on a communication technology. One or more client interfaces are initiated.

The client interfaces are aware of the server. Actual network application code is adapted to make use of the client interfaces and the adapted network application code is able to communicate with the server. The network simulator is adapted to interoperate with the server so that the application code's communication appears to originate from a simulated node to which it is mapped. Application code is modified via the client/server by removing or inserting messages to or from simulated nodes.

In an embodiment according to the present invention, a method for virtually simulating actual networked applications within a network simulation is provided. One or more servers are initiated to interface to a network simulator. One or more clients are initiated to interface with one or more servers. The communications of each network application code 'bridged' into the simulation is adapted via the client/server approach such that its communications appears to stem from a simulated node as far as other simulated nodes or applications also so bridged are concerned. Messages or packets from application code are inserted or extracted from the simulated node via the client/server. In an embodiment according to the present invention, the above described functionality is encapsulated in a client and server process.

DETAILED DESCRIPTION

Figure 1:
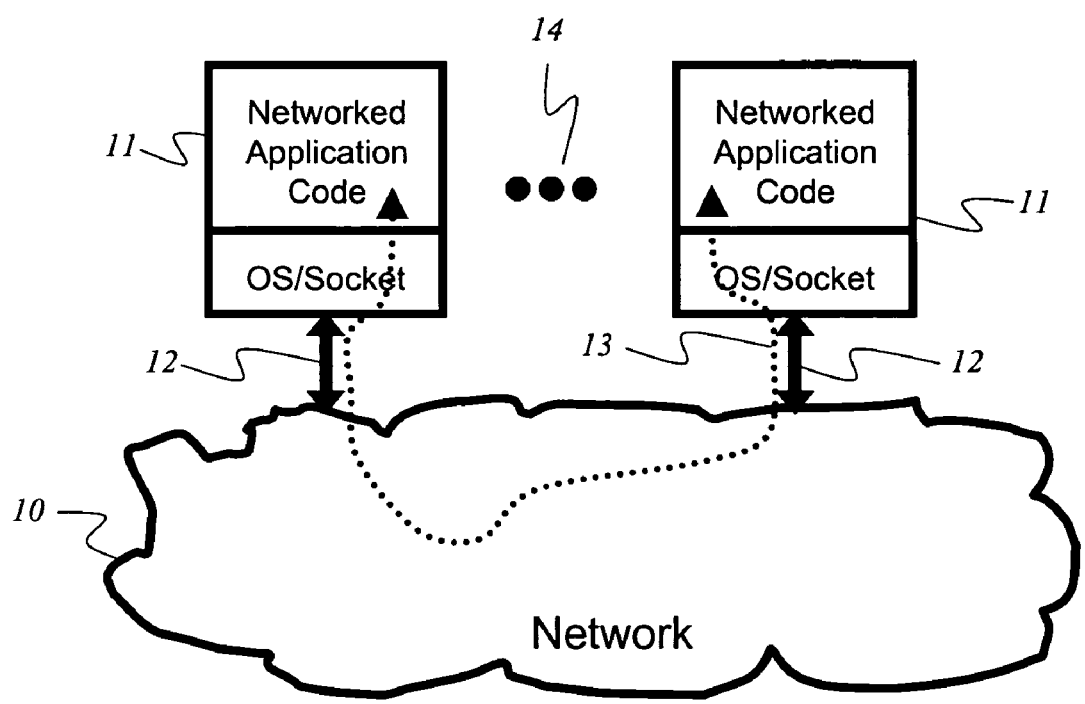
FIG. 1 depicts prior art of typical networked application codes communicating over a network.

In accordance with an embodiment of the present invention (hereafter, the Splug™ system), a server interoperates with a network simulator to effectively enable the virtual mapping of an actual network application onto a simulated node. Network applications adapted via this disclosure will be called 'bridged' applications. Such bridged network application codes make use of the disclosed client-side libraries or interfaces to enable their interoperation with the Splug™ server. This client side interface modifies the normal communication route of packets or messages stemming from the Splug™ enabled application codes to instead interoperate with the Splug™ server. The Splug™ server receives such communications and translates them such that they appear to stem from a simulated node in accordance with a mapping. In certain embodiments of the present invention, the reverse of the above process is used when an application code bound message or packet arrives at a node whereby it is transmitted and mapped back to the application code through the Splug™ server and appropriate Splug™ client. The simulated nodes that bridged applications are virtually operating on can be of various types that are supported by the simulator. For example, the node types could include fixed, aerial or mobile nodes. This allows one or more actual application codes to appear as though it is operating on a simulated node. Full interoperation of multiple application codes as well as purely simulated applications is possible.

In many network simulators, application level and other protocol packets do not carry actual data; only the size of these simulated packets are conveyed and processed. However, some network simulators do operate in such a way as to allow simulation of application and other message/packet data transfer; and others can be readily modified to do so. Both of the above cases are supported in embodiments of the present invention. For example, the disclosed invention is able to transfer actual message contents, both among application codes and internal simulated models. The use of a simulator that is able to simulate actual data transfer is the preferred embodiment. However, it should be understood by one skilled in the art, that the present invention can provide internal data transfer within the simulation if necessary. However in existing simulation technologies, applications do not react to actual data being received as data is not being transferred through the simulator. In the embodiments of the present invention where the simulator does permit data transfer or has been augmented to do so as described further below, both simulated and actual applications may operate in accordance with data being sent/received (e.g., they may be reactive to message contents.). In cases where the simulator does not provide internal data transfer, Splug™ bridged applications may still act in a reactive manner making use of actual data transfer as the Splug server can be used to provide the simulated data transfer rather than make use of such facilities within the simulator.

The disclosed invention is applicable to any type of network application code. Although embodiments of the present invention are discussed as though they are client-type tools to aid understanding, it should be understood by one skilled in the art that the invention is applicable to various servers, discovery protocols, and middleware. For example, an embodiment according to the present invention allows a web-server and multiple web clients to act within a simulation. But also in an embodiment according to the present invention, Common Object Request Broker Architecture (CORBA) distributed object middleware applications can be mapped onto a simulator. Without limitation, some benefits stemming from this invention include the ability to qualitatively and quantitatively assess application performance and react to simulated network conditions. Moreover, the present invention allows for actual application codes to be readily simulated within a large network environment.

FIG. 1 illustrates the prior art of two networked application codes communicating. The network (10) is used by the application codes (11) as connected via a link (12) to communicate with each other. Typically and as shown, a networked application (11) will use some operating system (OS) features or library (e.g. the Berkeley socket library or Microsoft's Winsock) to enable communication. The network establishes the route with which the applications logically communicate (13). Note that the application codes would be contained on a host computer, but that is not shown as the focus is on the logical connection(s) of applications via the network. Similarly, the links (12) used to connect would actually be physical links of some type, wired or wireless, however they are viewed logically here as well. The ellipsis (14) indicates that any number of application codes may be communicating via the network.

Figure 2:
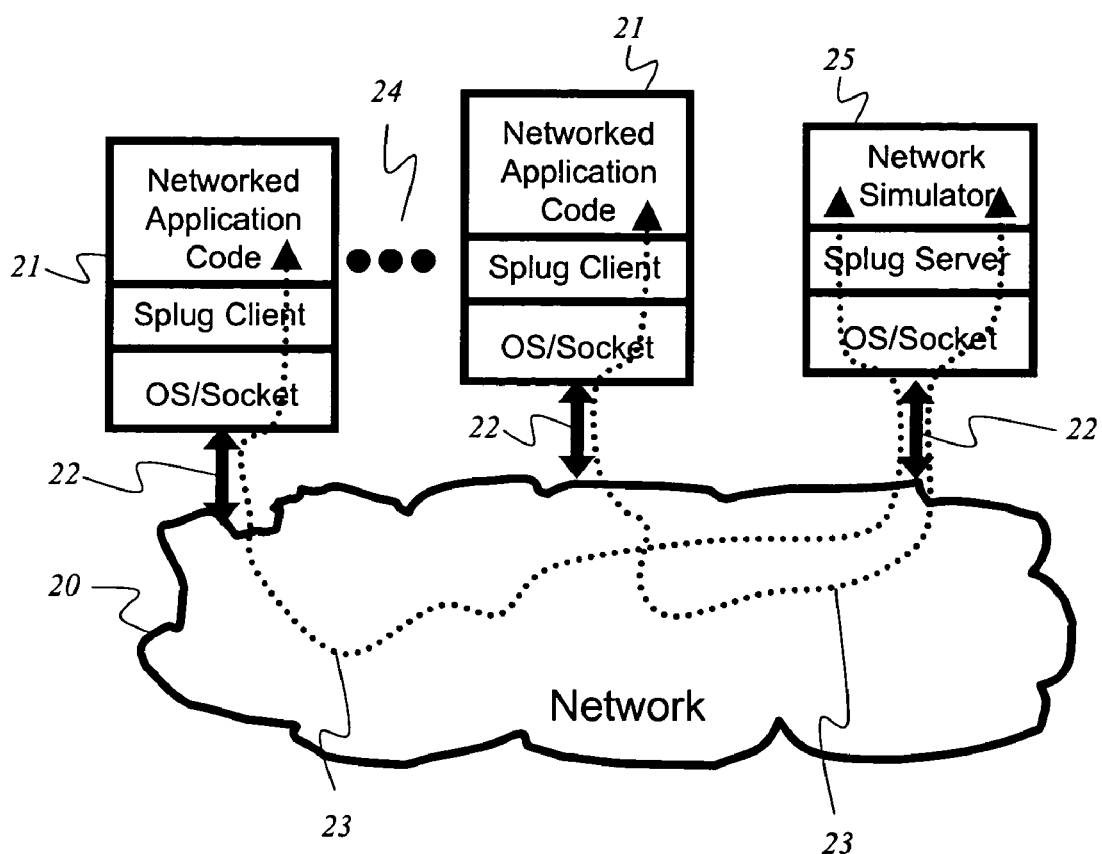
FIG. 2 depicts an overview of communication flows for the current invention using the Splug™ client(s) and server in conjunction with a network simulator.

FIG. 2 depicts an overview of an embodiment of the present invention. Here, the network (20) is used as a means of communication between Splug™-interfaced application codes (21) and the Splug™-enhanced network simulator (25). Again the ellipsis (24) indicates that any number of application codes may be used. Each is connected to the network via a link (22) and communicates over routes (23) as provided by the network. Unlike the prior art shown in FIG. 1, the application code of the present invention communicates with the Splug™ client interface rather than the system-provided network interface library/OS functions ("OS/Socket" in FIGS. 1-2), although the Splug™ library can in turn use OS/socket interfaces as illustrated in FIG. 2. As noted above, the prior art system shown in FIG. 1 uses a system network interface library (e.g., the sockets library, labeled OS/Socket). In contrast, in accordance with the embodiments according to the present invention, an interface (labeled Splug client in FIG. 2) that provides the same functions as the system network interface library is implemented. In such an embodiment, the application appears to be using normal network programming application programming interface (API) (e.g., sockets), but is instead using the library (e.g., which in turn may use the normal sockets library). The library implements the interface (e.g, which has the same functionality of the sockets interface).

The interface alteration can be accomplished in a number of ways. For example, the network functions used by the application code can be changed to use the Splug™ interface; the system-supplied network-interface library can be altered to include Splug™ features; or the underlying OS can be enhanced to include Splug™ features. Thus, a range of possibilities for incorporating Splug™ client interfaces could include recompiling, re-linking, or even replacement of the OS/network interface code (in which case no application level changes are needed).

The Splug™ client interface software, which may be used for any network application code including but not limited to web, email or database servers, middleware, discovery protocols, active network/remote method invocation codes, etc. alters the flow of communication such that communication instead flows to the Splug™ server. This may or may not include the data portion of the message/packet depending on the features of the network simulator. If the simulator does not support data transfer, a size parameter reflecting the packet could be transferred. As described in more detail below, the basic operation is that upon receipt of a message or packet from a Splug™ client (i.e., that which originally came from the application code), the Splug™ server uses a map of application code to simulated nodes to inject this communique into the simulator as though it stemmed from the simulated node.

A similar, reverse process is used when a message or packet arrives at a simulated node. If the message/packet is bound for an application code, the Splug™ server (25) then transfers this data via the network (20) to the appropriate Splug™ client(s) (21) which then provides it to the appropriate application code (a single Splug™ client interface on some computer may support several application codes). Determining the message destination may be based on any number of parameters, including but not limited to, node addresses, logical port identifiers, information in message headers/trailers/data portions, etc. The net effect is that application codes (21) bi-directionally communicate via the Splug™ server which in turn uses the network simulator to mimic the operation of these codes as though they were resident on various nodes in the simulation. Thus, both a qualitative and a quantitative assessment of application and network performance can be made. Likewise, actual application codes and simulated application models can interoperate reactively with each other in the context of a network simulation. Moreover, advanced emulation features can be applied to application codes (e.g., the ability to map application codes to act as though on a particular simulated node).

Figure 3:
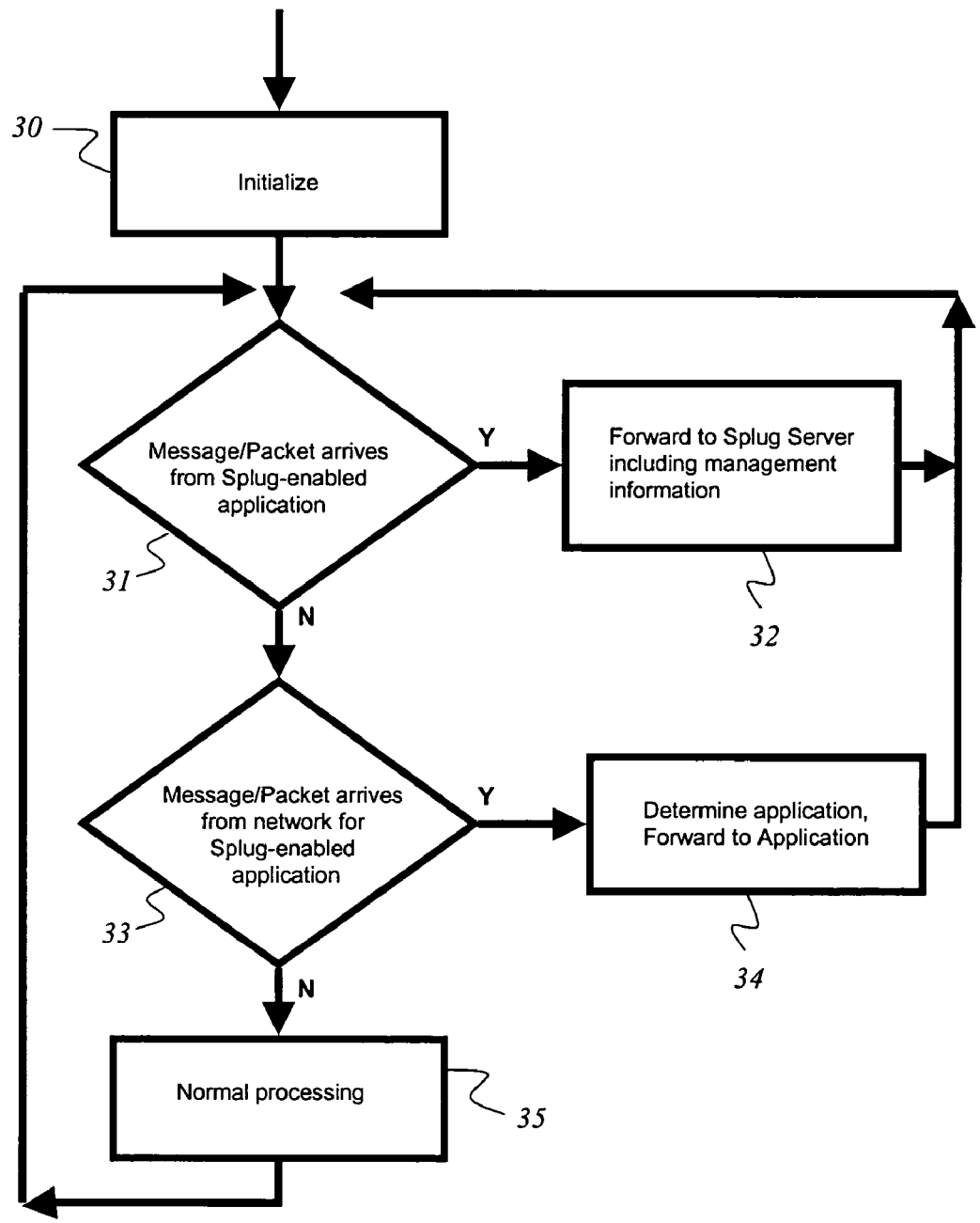
FIG. 3 depicts the Splug™ client-side logical operation as a flow diagram.

FIG. 3 depicts the logical operation of the Splug™ client interface. The first step (Step 30) performs initialization, such as determining the location of Splug™ server and determination of which applications are to be included in Splug™ simulation (not all applications on a computer need be included in the Splug™ simulation). This initialization step may also entail communications with the Splug™ server should that be necessary in a particular embodiment. The data needed for such initialization may come from, but is not limited to, initialization file(s), database(s), from the Splug™ server or other network provided initialization for use with Splug™. The initialization file for each Splug™ client can comprise the location of the Splug™ server. This information could, for example, be entered by a user, preconfigured into the Splug™ client library code, be sent by a database, or be sent by a net server. The initialization file for the server can comprise information for mapping each client application to a particular node in the simulation. This information can also come from a variety of places, for example, a file on the server, a database, via a network server, of configured into initialization traffic between the client and server (e.g. in this case the client tells the server which node in the simulation it is to be virtually simulated on). In certain embodiments according to the present invention, a shared directory between server and clients containing initialization file(s) can be used for configuration. An application residing on some host may have several physical interfaces/links available to the network (shown in FIG. 2 with the multiple lines (22) for a single application (21)), determination of which interfaces to use may also be included in the initialization.

In a message/packed arrival step (Step 31) of FIG. 3, a test is made to see if a packet or message has arrived from a participating Splug™-enabled application. As the Splug™ client interface may reside within a host system's OS or socket library, communications related to networked applications that are not participating in a Splug™ simulation may be passed (bi-directionally) without change. Should this message/packet stem from a Splug™ enabled application, it is processed (Step 32) for forwarding to the Splug™ server. This processing (Step 32) may include adding some management overhead information for the purpose of aiding the Splug™ server when it injects the packet into the simulation.

A similar reverse process is followed for packets arriving from the network coming from the Splug™ server. Messages or packets are detected that come from the Splug™ server destined for an Splug™-enabled application code (Step 33). Any management information is stripped from the message/packet and the contents are passed to the application in accordance with the application mapping (Step 34). Should a message or packet arrive that does not fit the requirements of Step 33 or Step 34, normal processing is performed (Step 35).

Figure 4:
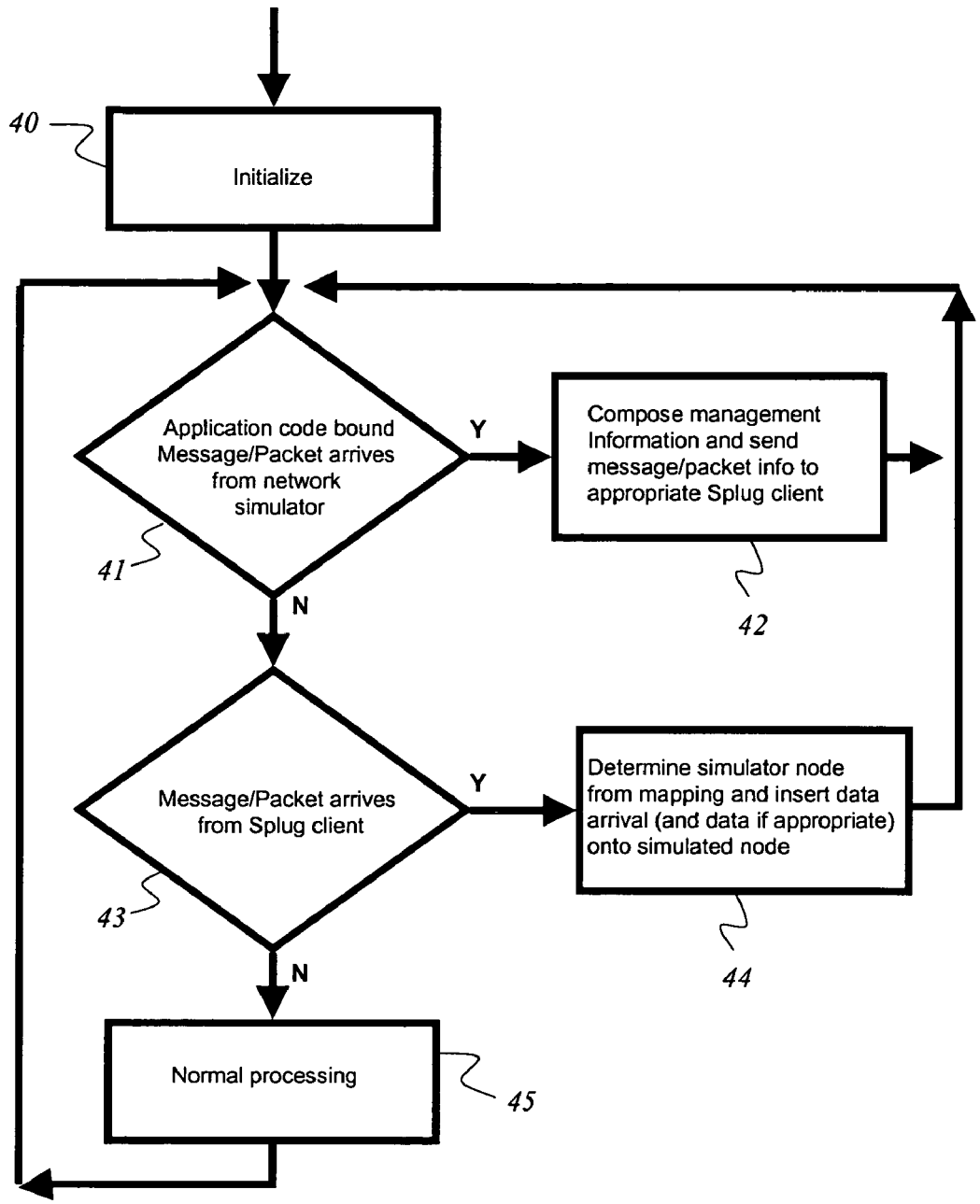
FIG. 4 depicts the Splug™ server logical operation as a flow diagram.

As seen in FIG. 4, on the Splug™ server side, similar techniques are used. After the system is initialized (Step 40), a message or packet arrival stemming from the network simulator is checked/detected as one bound for a Splug™ client (e.g., in accordance with the mapping of network traffic to application codes) or not bound for the Splug™ client (Step 41). If this is indeed bound for a client, it is re-transmitted to the appropriate Splug™ client (Step 42), including the addition of Splug™ management overhead should that be needed in a particular embodiment. When a message/packet arrival from the network from a Splug™ client is detected (Step 43), its arrival is mapped into the simulator (Step 44). Otherwise, normal processing is used (Step 45).

Those skilled in the art will recognize that there are many different algorithmic and other means for achieving the basic operation of detection and forwarding/retransmittal processes shown in FIGS. 3 and 4. These may include, but are not limited to, use of interrupt-driven, synchronous or asynchronous communications for packet arrival detection, use of incoming and outgoing queues, variations on the logical flow (e.g. interchange of the decision code), etc.

Figure 5:
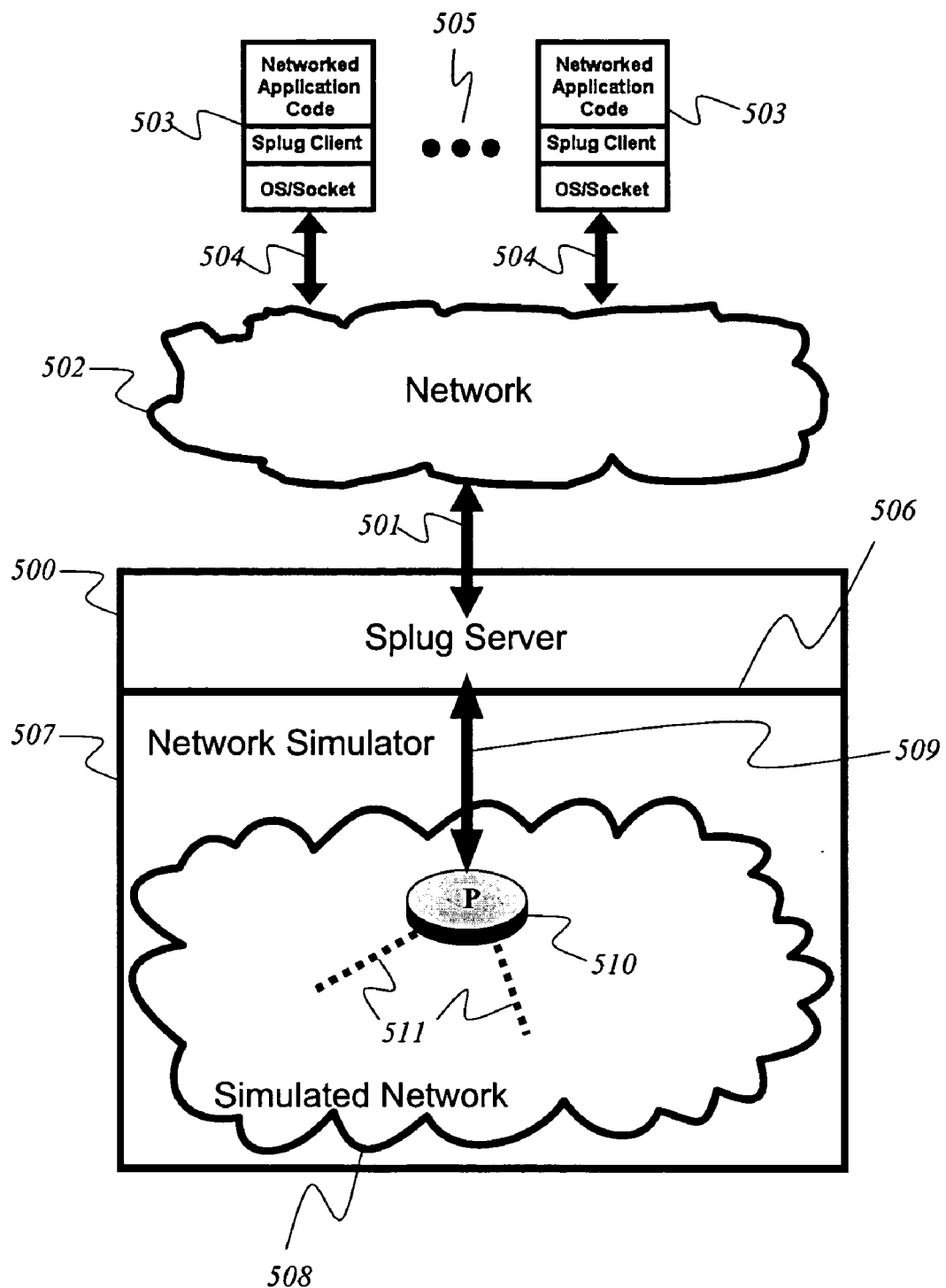
FIG. 5 depicts an embodiment of the present invention.

FIG. 5 depicts an embodiment according to the present invention in more detail, extending the initial overview description of FIG. 2 to include a more detailed view of the network simulator interface. As before, the Splug™ server (500) connects, via a first connection (501), to a physical network (502) in order to connect, via second connection (504), to a plurality (505) of Splug™ clients (503) that are in turn interfaced to some application code(s). The details of the interface (506) to the network simulator (507) depends on the embodiment, however the required interface aspect (509) is that an arriving packet from the server be able to be inserted into the simulation as though it stems from a particular node (510) within a simulated network (508) and that a simulated packet arrival at a node as determined to be destined to a Splug™-client application code be detectable by the Splug™ server. This enables bidirectional and transparent message exchange between actual application codes as though they existed within the simulated network (508). Some network simulated links (511) are also depicted in the figure.

FIG. 5 illustrates a single simulated node (510). However, it should be understood by one skilled in the art that the invention is applicable to multiple simulated nodes and application codes as well as an arbitrary mapping (509) between them. Furthermore, this mapping may be either static in the sense that it is fixed during the whole simulation or dynamic (e.g., can remain the same or change during the course of the simulation.) This latter case of dynamic mapping provides support for, but is not limited to, network technologies such as active networks, code migration, and dynamically executed/delivered code (e.g., Java).

With respect to the Splug™ server/network simulator interface, one preferred embodiment of the invention is to execute the Splug™ server code as part of the network simulator itself (requiring changes to the simulator). However, other embodiments are also possible. For example but without limitation, the network simulator may have facilities for various external interfaces; the Splug™ server can be implemented as a custom model or other facility within the simulator, etc. Those skilled in the art will recognize that it is also possible to extend the basic operation of the invention to allow multiple Splug™-servers and network simulators.

On the physical network side of the server (502), the preferred embodiment would be a LAN or other high-speed resource so as to minimize the added latency incurred between the application code and network simulator. However, any communication mechanism is acceptable. For example, multicasting, anycasting or broadcasting could be used in lieu of the point to point communication mechanism depicted in FIG. 2. To ease communication contention, multiple network interfaces may be used on the computer hosting the Splug™ server or clients. In sum, the network (502) and the first and second connections (501, 504) and the means for using communication over it in order to use the invention disclosed here are offered merely as an example and are completely arbitrary. Application codes as interfaced to Splug™ client interfaces may reside on a single computer platform or on multiple platforms. When using multiple platforms supporting multiple application codes, application code execution is inherently distributed/parallel in nature. This aspect may aid in scalability of the system, that is aid in supporting a large number of application codes within a simulation. Also, as the application code can operate unaltered except for the way that network communications is carried out, the application user interface and other aspects could remain the same, despite the change in the system configuration.

As described thus far, the simulation of communication within the simulator as supported by the Splug™ invention has been discussed as being a point-to-point communication style. However this is merely exemplary and other types of communication could also be used, such as, multicast, anycast or broadcast messaging styles. For example, broadcast messages/packets stemming from or destined to an application code can also be injected into or extracted from simulated nodes via the Splug™ invention in a manner similar to the prior description.

In a preferred embodiment of the present invention, the network simulator executes in real-time (e.g., wall-clock time) such that events are scheduled to occur in accordance to their actual timestamps. By executing in real-time, the actual communication events within the application code can coincide properly with each other and internal simulated models, within the tolerance of the extra latency incurred in transferring/translating communication from Splug™ client/server and into and out of the simulation and the latency due to the simulation itself. However, the invention is not limited to using real-time or wall-clock network simulation, it should be apparent to one skilled in the art that faster or slower than real-time network communication scheduling is also valid, subject to the fact that actual application code(s) may experience communications at time points different from that as would be experienced than using a wall-clock scheduling technique.

In an embodiment according to the present invention, the information contained in communicated messages or packets may include network addresses of some type (e.g., when an application places its own Internet Protocol (IP) address or a TCP port number within a data packet). In such an embodiment, host or network identifications (e.g. host numbers, IP numbers, ports, etc.) within the simulation can be the same as the application code. For example, the node identity and ports are arbitrary in the simulation and these can be selected to match those of the actual application code hosts or ports. In this way, the system properly allows and supports the exchange and use of network addresses or ports or other addressing data within the data body of messages for subsequent use. For example, one Splug™-enabled application may provide a network address to another Splug™-enabled application via a message, and this data can then be correctly used to address another Splug™-enabled application.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for virtually simulating actual networked applications within a network simulation, comprising the steps of:

providing, on each of a plurality of clients, an actual networked application code and a client interface which communicates with the actual network application code;

providing a network simulator that simulates a network of communicating nodes;

providing a server that interfaces to the network simulator, the server comprising functionality for establishment of a bidirectional mapping of communications of said actual networked application codes to a simulated node in the network simulators, the client interfaces being aware of the server and communicating with the server over a network; the network simulator being able to interoperate with the server such that communication to the actual networked application code from the server appears to originate from the simulated node to which the actual networked application code is mapped; and modifying, via the client interfaces and the server, the actual networked application code by removing or inserting messages to or from simulated nodes.

2. The method as recited claim 1 wherein the network simulator is IP based.

3. The method as recited in claim 2 wherein the network simulator further comprises an upper layer protocol.

4. The method as recited in claim 3; wherein the protocol is selected from the group consisting of TCP and UDP upper layer protocols.

5. The method as recited in claim 1 wherein the actual networked application codes utilizes a communication style selected from the group consisting of point-to-point, anycast, multicast and broadcast.

6. The method as recited in claim 1 wherein the network simulator comprises a plurality of network simulators.

7. The method as recited in claim 1 wherein the server comprises a plurality of servers.

8. The method as recited in claim 1 wherein the mapping of actual networked application codes to the simulated node is dynamic.

9. The method as recited in claim 1 wherein the network simulator executes in real-time.

10. The method as recited in claim 1 wherein the execution time of the network simulator is configurable.

11. The method as recited in claim 1 wherein the client interfaces and the server are implemented on separate hardware.

12. The method as recited in claim 1 wherein the server is a plug in to the simulator.

13. A method for virtually simulating actual networked applications within a network simulation, comprising the steps of:

initiating a server to interface to a network simulator;

initiating a plurality of client interfaces to interface with the server over a network, the client interfaces communicating with networked application codes on a plurality of clients;

bridging the actual networked application code via the client interfaces so that the actual network application codes can communicate with the server;

mapping the communications of the actual networked application codes to a simulated node in the simulator, communication from the actual networked application codes now appearing to originate from the simulated node; and insertion of and extraction of messages or packets from the actual networked application codes to the simulated node, or from the simulated node to the actual networked application codes, via the client interface and the server.

14. The method as recited in claim 13 wherein the step of initiating a server further comprises the step of establishing bidirectional mapping of the actual networked application codes to the simulated node in the network simulator.

15. The method as recited in claim 13 wherein the actual networked application codes are executed in parallel over a distributed system.

16. The method as recited claim 13 wherein the network simulator is IP based.

17. The method as recited in claim 16 wherein the network simulator further comprises a protocol selected from the group consisting of TCP and UDP upper layer protocols.

18. The method as recited in claim 13 wherein the actual networked application codes further utilize a communication style selected from the group consisting of point-to-point, anycast, multicast and broadcast.

19. The method as recited in claim 13 wherein the network simulator comprises a plurality of network simulators.

20. The method as recited in claim 13 wherein the server comprises a plurality of servers.

21. The method as recited in claim 13 wherein the mapping of the actual networked application codes to simulated network node is dynamic.

22. The method as recited in claim 13 wherein the network simulator executes in real-time.

23. The method as recited in claim 13 wherein the execution time of the network simulator is configurable.

24. The method as recited in claim 13 wherein the client interfaces and the servers are implemented on separate hardware.

25. The method as recited in claim 13 wherein the networked application codes are executed in parallel over a distributed system.

26. The method as recited in claim 13 wherein the server is a plug in to the simulator.

27. A computer system for virtually simulating actual networked applications within a network simulation comprising:

a plurality of clients, each client having a client interface, the client interface communicating with an associated actual networked application code executing on the client;

a network simulator that simulates a network of communicating nodes;

a server, the server having functionality for interfacing to the network simulator;

and wherein each client communicates with the server over a network, and wherein each client executes the actual networked application code and the client interface so that the actual networked application code can communicate with the server, and wherein each client interface maps its associated actual networked application code to one of the simulated nodes so that communication from the networked application code now appears to originate from the simulated node;

and wherein each client interface, upon receiving messages or packets from its associated actual networked application code destined for the network simulator, inserts management information into the messages or packets from the actual networked application code, and forwards the messages or packets including the management information to the server;

and wherein the server, upon receiving messages or packets from one of the networked application codes, creates, in accordance with the mapping of said one of the networked application codes, and inserts a simulated message or packet of the same size and content into the network simulation of the network simulator;

and wherein the server, upon receiving messages or packets from the network simulation destined for one of the networked application codes, inserts management information into the messages or packets from the network simulator, and forwards the messages or packets including said server inserted management information to the client interface with which said one of the networked application codes is associated;

and wherein each client interface, upon receiving messages or packets from the server destined for its associated actual networked application code, strips server inserted management information from the messages or packets, and forwards the messages or packets without the management information to the actual networked application code.

28. The system according to claim 27, wherein server has functionality for providing message or packet transfer among simulated nodes and/or networked application codes.

* * * * *